No. 769,413. PATENTED SEPT. 6, 1904.
C. J. SIMEON, T. ST. J. B. PARNALL & W. E. HIPKINS.
WEIGHING MACHINE.
APPLICATION FILED APR. 22, 1904.
NO MODEL. 5 SHEETS—SHEET 1.

WITNESSES
INVENTORS
Charles John Simeon
Thomas St. J. B. Parnall
William Edward Hipkins
BY
ATTORNEYS

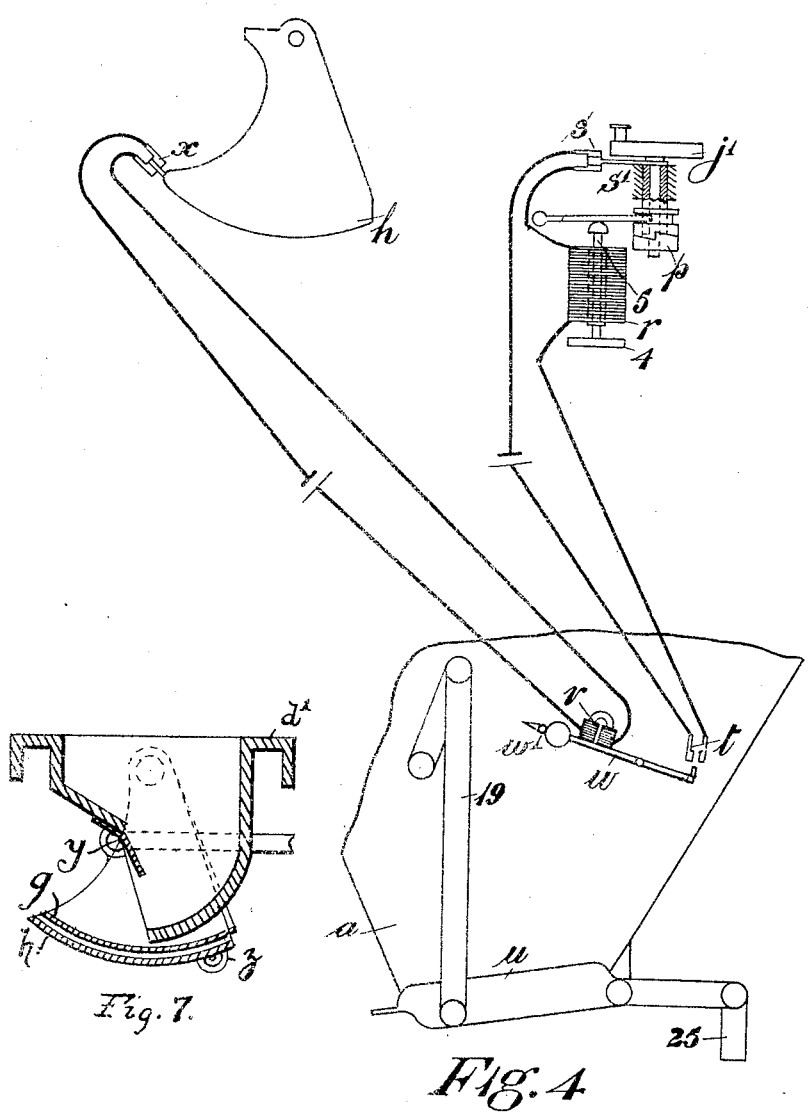

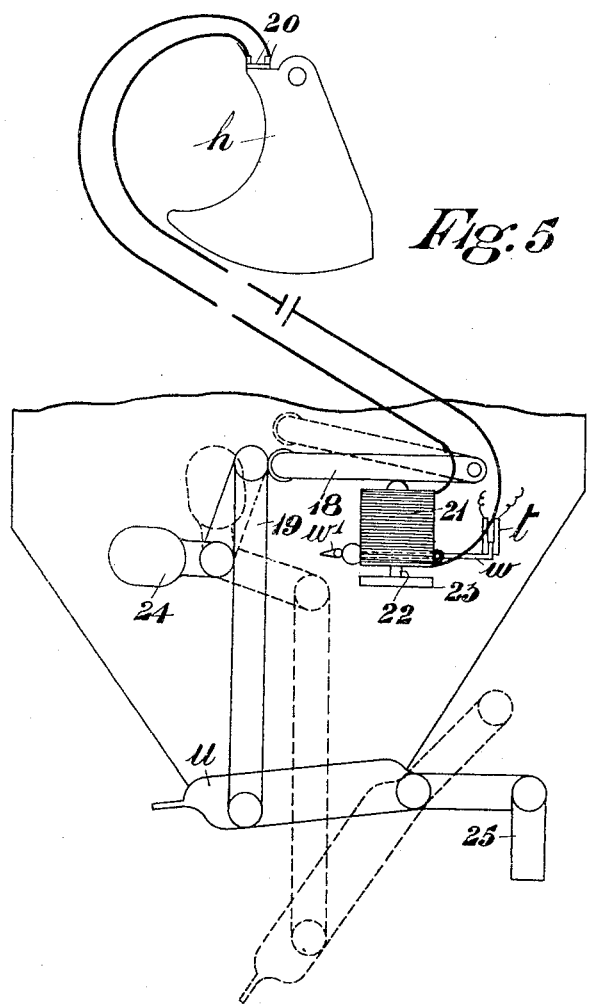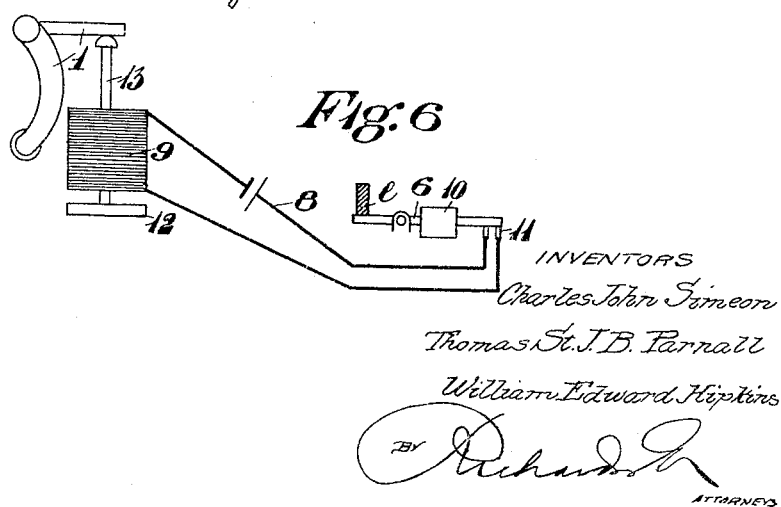

No. 769,413.                                      Patented September 6, 1904.

UNITED STATES PATENT OFFICE.

CHARLES JOHN SIMEON, THOMAS ST. JULIAN BABINGTON PARNALL,
AND WILLIAM EDWARD HIPKINS, OF BIRMINGHAM, ENGLAND.

WEIGHING-MACHINE.

SPECIFICATION forming part of Letters Patent No. 769,413, dated September 6, 1904.

Application filed April 22, 1904. Serial No. 204,430. (No model.)

*To all whom it may concern:*

Be it known that we, CHARLES JOHN SIMEON, THOMAS ST. JULIAN BABINGTON PARNALL, and WILLIAM EDWARD HIPKINS, subjects of the King of Great Britain and Ireland, residing at Soho Foundry, in the city of Birmingham, England, do hereby declare that we have invented certain new and useful Improvements Relating to Weighing-Machines, of which the following is a specification.

This invention relates to weighing-machines such as are adapted for the automatic weighing of grain, coal, or pulverulent materials, and has for its object to provide in a simple and convenient manner for the accurate weighing of either large or small quantities of the said materials and the effective control of the charging and discharging operations.

Figure 1:
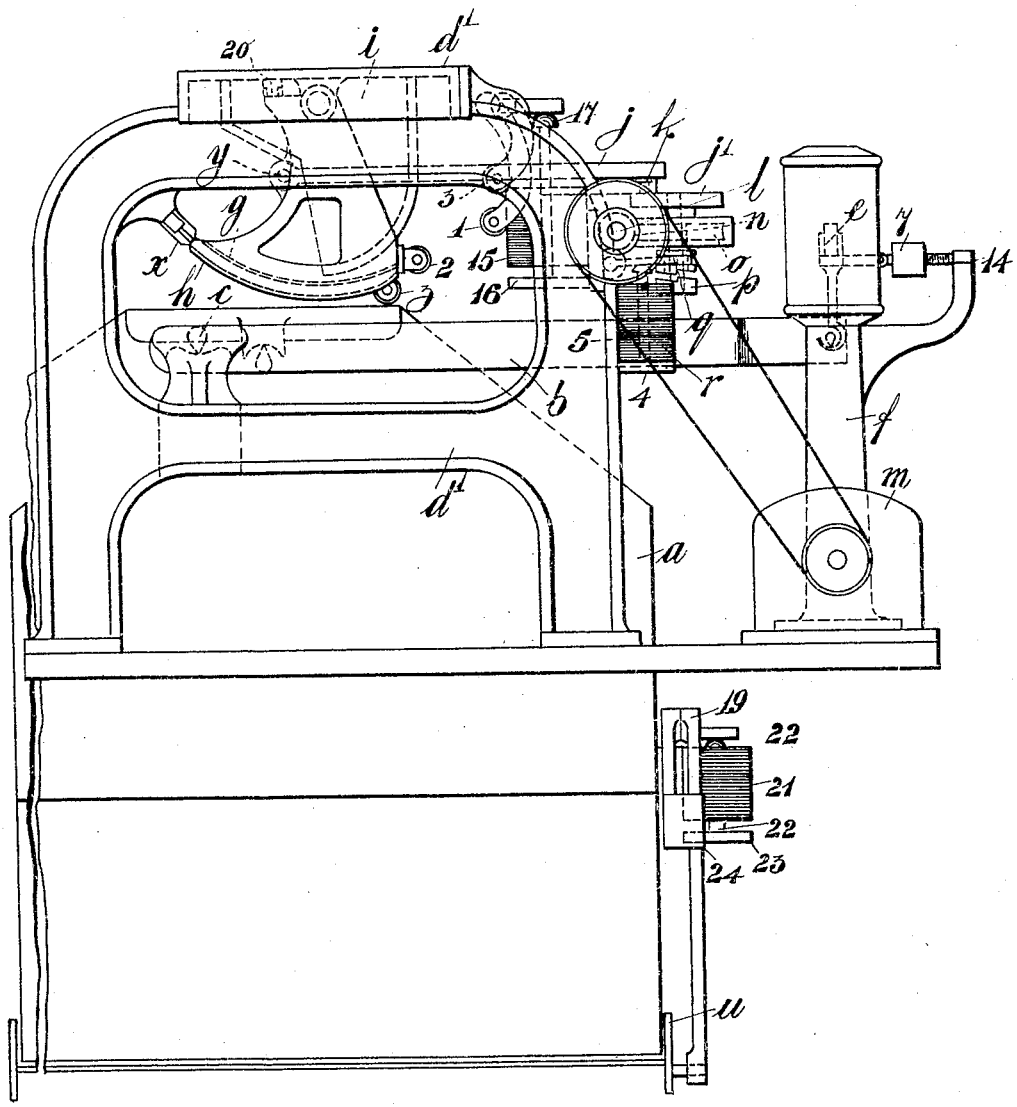
Figure 2:
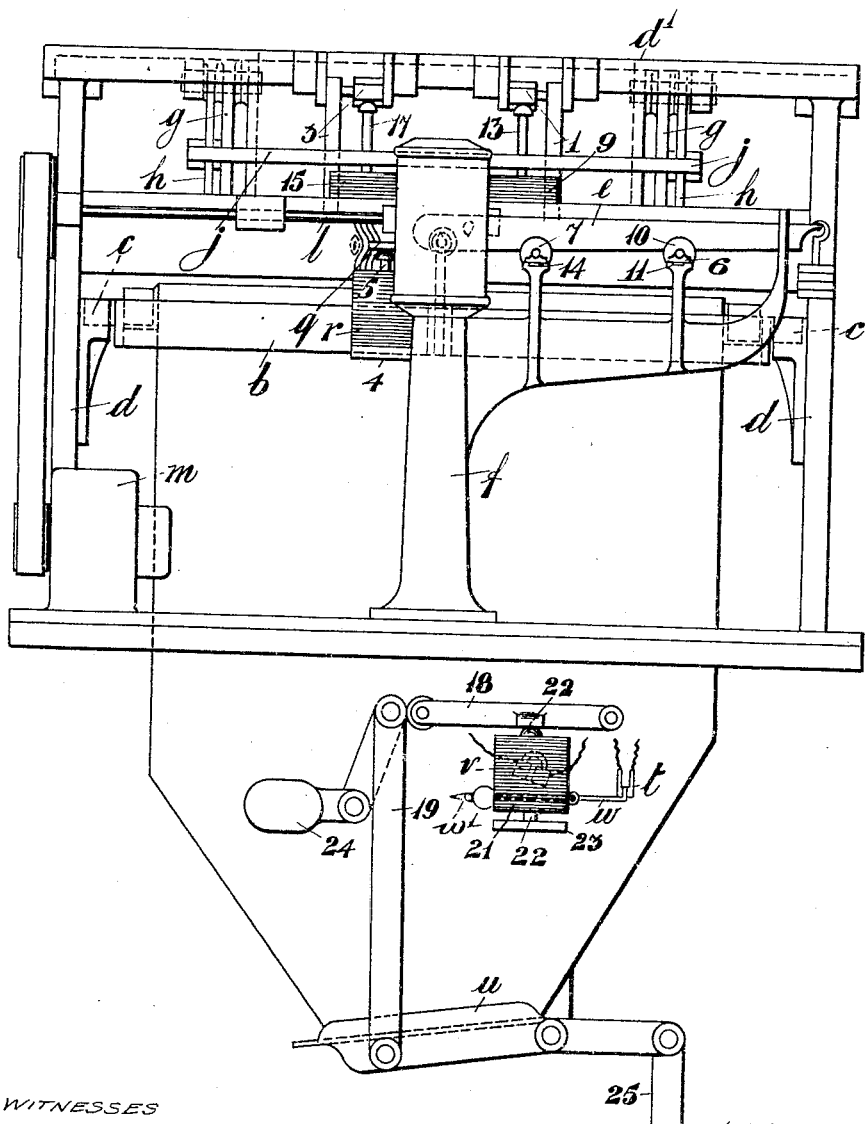
Figure 3:
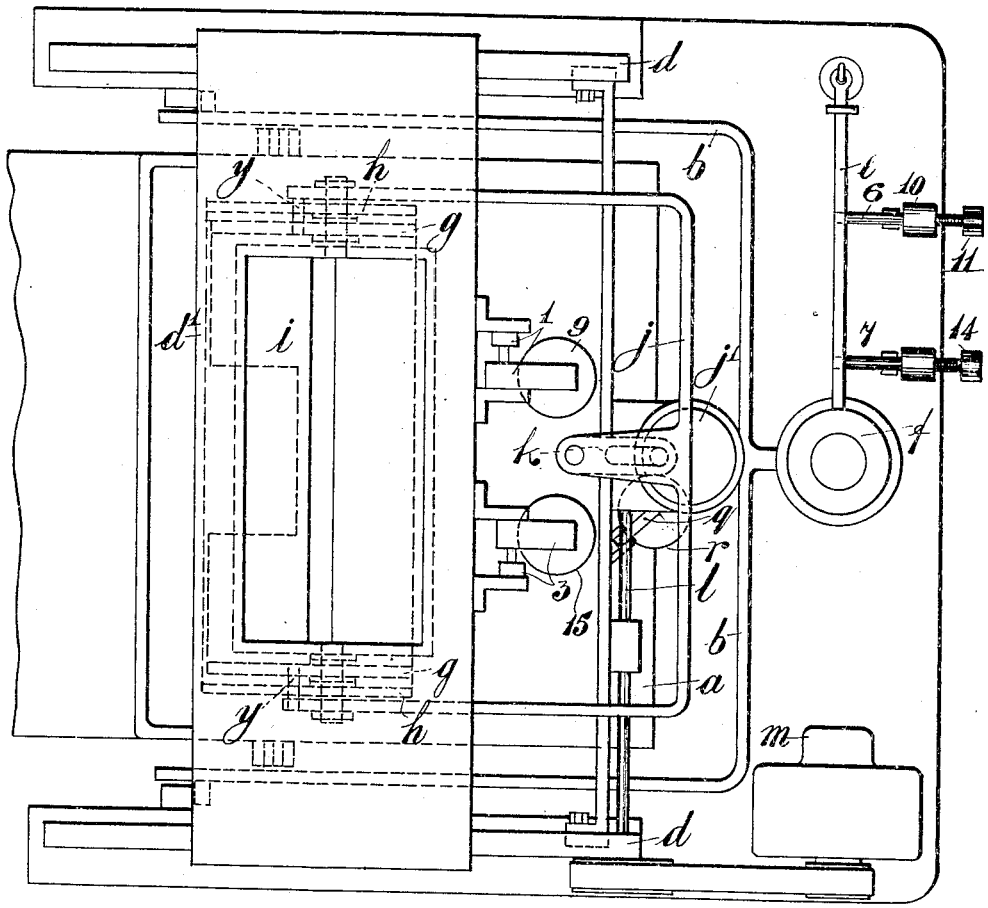

Referring to the five accompanying sheets of explanatory drawings, Figure 1 is an end elevation, and Fig. 2 a side elevation, of an automatic weighing-machine constructed in accordance with this invention, while Fig. 3 is a plan view of the same. Figs. 4, 5, and 6 are diagrammatic views illustrating the arrangements of the electrical circuits for actuating different portions of the machine. Fig. 7 is a detail sectional view of the gates.

The same reference characters in the different views indicate the same parts.

The weighing receptacle or hopper $a$ is pivotally mounted upon a balance beam or lever $b$, connected at one extremity through its fulcrum $c$ to the standards or end frames $d$ and at the opposite extremity to the steelyard $e$, mounted upon a standard $f$, such as is employed with platform-type weighing-machines.

Above the open upper extremity of the hopper $a$ we pivotally suspend from a crosspiece $d'$, connecting the end frames $d$, a pair of gates $g$ and $h$ for controlling the supply of material from a storage-chamber or a chute or channel communicating with the orifice $i$. The gate $g$ or the main gate is formed with an aperture through which the material to be weighed can pass when the gate is closed. It is therefore only capable of partially arresting the supply of material to the hopper $a$. The gate $h$ or the dribble-gate is, however, adapted to cover such aperture, and thus to completely interrupt the said supply.

The gates $g$ and $h$ are raised to permit the passage of material to the hopper $a$ by means of a connecting-rod $j$, secured at one extremity to the main gate $g$ and at the opposite extremity to the pin of the crank-disk or like element $j'$ through the medium of a slotted link $k$.

The crank-disk $j''$ is rotated from a countershaft $l$ (which is driven by an electric motor $m$ or in any other convenient manner) through a worm $n$, worm-wheel $o$, and clutch $p$. A clutch-lever $q$ is arranged in conjunction with and is operated by an electromagnet $r$, which is energized by a current passing through a circuit such as shown at Fig. 4. The said circuit is closed by a pair of switches $s$ and $t$ of any suitable form, respectively arranged for operation by a contact-bar $s'$, moving with the crank $j''$, and the hereinafter-described locking-levers of the door $u$ beneath the hopper $a$. A supplementary electromagnet $v$ is also arranged in conjunction with the outer extremity of the counterweighted contact-lever $w$ of of the switch $t$, for the purpose to be described. The circuit through the said magnet is controlled by a switch $x$, actuated by the dribble-gate. In the position shown by Fig. 4 the circuit through the switch $x$ is closed and the electromagnet $v$ is consequently energized, so that when the outer end of the lever $w$ is raised, as hereinafter described, the said magnet can retain the switch $t$ in the open position. Due to the interruption of the circuit through the electromagnet $r$ at the switch $t$, the clutch-lever $q$ is permitted to fall for the purpose of putting the clutch parts $p$ into engagement. The resultant rotation of the crank-disk $j''$ operates the connecting-rod $j$, and thereby raises the gates $g$ and $h$ about their pivotal supports. During such movement the switch $s$ is opened, due to the rotation of the bar $s'$ out of engagement therewith, and coincidently the switch $t$ is closed, due to the interruption of the circuit through the magnet $r$ on the opening movement of the dribble-gate. The magnet $r$ therefore remains out of action, and as the clutch members thus keep in engagement the crank-disk continues its rotation.

The simultaneous opening of the gates is effected by the abutment of the connecting-rod pins $y$ against the end plates of the dribble-gate $h$, as shown at Fig. 1. When the gates have been raised or opened to their full extent, a catch $z$, provided upon the main gate $g$, engages a bell-crank trip-lever 1, mounted on the framing of the machine, while another catch, 2, on the dribble-gate $h$ engages a similar trip-lever 3. After the crank $j''$ has rotated through one half of a revolution its further rotation through the latter half is performed independently of the gates, the slot in the link $k$ permitting of such independent movement. When the crank arrives at its original position, its rotation ceases, since in such position the contact-bar $s'$ completes the circuit through the magnet $r$, whereupon the clutch parts $p$ are withdrawn out of engagement by the elevation of the armature 4, thrust-rod 5, and lever $q$.

While the gates $g$ and $h$ are suspended in their fully-open position an unimpeded supply of material passes into the hopper $a$; but when the amount therein approximates the required weight the balance-beam $b$ is depressed, as hereinafter described, and the steelyard $e$ consequently elevated. Beneath the steelyard and in contact therewith are mounted a pair of weighted switch-levers 6 and 7, the lever 6 being arranged to close an electric circuit 8, Fig. 6, through an electromagnet 9, adapted to operate the trip-lever 1. The weight 10 of the said switch-lever 6 is so adjusted that it assists the elevation of the steelyard $e$, and thus causes the same to rise under the influence of the load in the hopper $a$ before the required weight of material has been admitted thereto. With the upward movement of the steelyard $e$ the switch-lever 6 closes the switch 11. The consequent energizing of the magnet 9 causes the armature 12 to raise the thrust-rod 13, which by operating the trip-lever 1 liberates the main gate $g$ and permits the same to rotate or fall into its initial position. The steelyard $e$ being thus relieved from the upward pressure of the weighted lever 6 is brought to rest. A diminished flow of material now passes into the hopper $a$ through the aperture in the main gate and continues until the amount of material in the hopper gives the required weight, when the steelyard experiences an additional elevation. Such further movement of the steelyard permits the weighted switch-lever 7 to close the switch 14, whereupon the magnet 15 is energized, and by the operation of the armature 16 upon the thrust-rod 17 and trip-lever 3 the dribble-gate $h$ is liberated, and by the falling of the same the supply of material is completely interrupted.

The material is retained within the hopper $a$ by means of the hinged door $u$, which is locked or secured against opening during the weighing operation by a bar or lever 18 engaging the upper extremity of a link 19; but when the dribble-gate descends to its original position it closes a switch 20, Fig. 5, and thereby completes a circuit through an electromagnet 21. The consequent elevation of the thrust-rod 22, connected with the armature 23, effects an upward movement of the bar 18, and thereby liberates the door which opens under the influence of its superincumbent load. After the discharge of the hopper contents the door is reclosed by the counterweights 24 and 25. When the door $u$ returns under the influence of its weights, the link 19 engages the extremity of the contact-lever $w$ and by elevating the same opens the switch $t$. The current through the magnet $r$ is therefore interrupted, the crank-disk $j''$ is again set in motion, and the gates are raised for the admission of a further quantity of material to the hopper.

The lever $w$ is prevented from falling into engagement with the switch $t$ by the magnet $v$, which continues its action until the gates have again begun to open. By the provision of a pivoted trip-piece $w'$ on the lever $w$ the link 19 only actuates the said lever on the return of the door $u$.

As soon as the gates commence to open, the circuit, through the magnet 21, by way of the switch 20, is interrupted, and in consequence the locking-bar 18 is permitted to fall into engagement with the link 19, and thus prevent accidental opening of the door during the subsequent influx of material to the hopper. When the hopper has discharged its contents, the steelyard resumes its original depressed position, and thereby effects the reopening of the circuits through the magnets 9 and 15. After the closing of the hopper-door the machine passes through the same cycle of operations, as hereinbefore described.

For the weighing of different quantities of material appropriate weights are attached to the outer extremity of the steelyard $b$.

The current may be supplied to the different circuits hereinbefore described either from primary cells or batteries or from an electric-supply main. In the latter case transformers, rectifiers, or other suitable accessories are employed, if necessary.

Having thus described our invention, what we claim as new, and desire to secure by Letters Patent, is—

1. In automatic weighing-machines for grain, coal, or pulverulent materials, the combination with a weighing receptacle or hopper, of hinged or pivoted gates controlling the supply of material to the hopper, means consisting in part of an intermittently-rotating element for opening the said gates, and independent means for releasing the gates consisting in part of electromagnets and circuits therefor, the said circuits being controlled by the movements of the hopper, substantially as described.

2. In automatic weighing-machines for grain, coal, or pulverulent materials, the combination with a weighing receptacle or hopper, of hinged or pivoted gates controlling the supply of material to the hopper, means consisting in part of an intermittently-rotating element for opening the said gates, trip-levers maintaining the said gates in their open position, and means independent of said rotating element for releasing the said trip-levers consisting in part of electromagnets and circuits therefor, the said circuits being controlled by the movements of the hopper, substantially as described.

3. In automatic weighing-machines for grain, coal, or pulverulent materials, the combination consisting of a weighing receptacle or hopper, a hinged or pivoted counterweighted door at the bottom of the said hopper, a locking bar or lever for the said door, an electromagnet operating the said bar, hinged or pivoted gates controlling the supply of material to the hopper, means consisting in part of an intermittently-rotating element for opening the said gates, and means for releasing the gates consisting in part of electromagnets and circuits therefor, the said circuits being controlled by the movements of the hopper, substantially as described.

4. In automatic weighing-machines for grain, coal, or pulverulent materials, the combination consisting of a weighing receptacle or hopper, a hinged or pivoted counterweighted door at the bottom of the said hopper, a locking bar or lever for the said door, an electromagnet operating the said bar, an oscillatory link having one end connected with the door and its opposite end in contiguity with the said locking-bar, hinged or pivoted gates controlling the supply of material to the hopper, means consisting in part of an intermittently-rotating element for opening the said gates, and means for releasing the gates consisting in part of electromagnets and circuits therefor, the said circuits being controlled by the movements of the hopper, substantially as described.

5. In automatic weighing-machines for grain, coal, or pulverulent materials, the combination consisting of a weighing receptacle or hopper, a hinged or pivoted counterweighted door at the bottom of the said hopper, a locking bar or lever for the said door, an electromagnet operating the said bar, a hinged or pivoted gate having an aperture therein for controlling the main supply of material to the hopper, a hinged or pivoted gate beneath the said main gate for controlling the secondary or dribble supply, means consisting in part of an intermittently-rotating element for opening the said gates, means for releasing the gates consisting in part of electromagnets, and a switch operated by the movement of the said dribble-gate for controlling the energizing of the aforesaid magnet operating the locking bar or lever of the hopper-door, substantially as described.

6. In automatic weighing-machines for grain, coal, or pulverulent materials, the combination consisting of a weighing receptacle or hopper, a balance beam or lever having the said hopper mounted thereon, a steelyard arranged in connection with the said balance-lever, main and dribble gates controlling the supply of material to the hopper, means for liberating the said gates consisting in part of electromagnets, and switches controlling the energizing of the said magnets, the said switches being operated by the movements of the said steelyard substantially as described.

7. In automatic weighing-machines for grain, coal, or pulverulent materials, the combination consisting of a weighing receptacle or hopper, a hinged or pivoted counterweighted door at the bottom of the said hopper, a locking-bar for the said door, an electromagnet operating the said bar, a balance beam or lever having the said hopper mounted thereon, a steelyard arranged in connection with the said balance-lever, main and dribble gates controlling the supply of material to the hopper, means for liberating the said gates consisting in part of electromagnets, switches controlling the energizing of the said magnets, the said switches being operated by the movements of the steelyard, and a switch operated by the movements of the said dribble-gate for controlling the energizing of the aforesaid magnet operating the locking bar or lever of the hopper-door, substantially as described.

8. In automatic weighing-machines for grain, coal, or pulverulent materials, the combination consisting of a weighing receptacle or hopper, a balance beam or lever having the said hopper mounted thereon, a steelyard arranged in connection with the said balance-lever, main and dribble gates controlling the supply of material to the hopper, means consisting in part of an intermittently-rotating element for opening the said gates, trip-levers maintaining the said gates in their open position, means for releasing the said trip-levers consisting in part of electromagnets, and switches controlling the energizing of the said magnets, the said switches being operated by the movements of the said steelyard, substantially as described.

9. In automatic weighing-machines for grain, coal, or pulverulent materials, the combination consisting of a weighing receptacle or hopper having a hinged or pivoted counterweighted door, main and dribble gates controlling the supply of material to the said hopper, means for closing the said gates consisting in part of electromagnets and circuits therefor, the said circuits being controlled by the movements of the hopper, and means for operating the gates, consisting of a constantlyrotating sliding clutch part, a corresponding clutch part adapted to be put in or out of gear with the said rotating part, a crank-plate rotatable with the clutch, a lever carrying the sliding clutch part, an electromagnet adapted to operate the said lever, an electric circuit for the said magnet, switches in the said circuit, a contact-bar for one of the said switches rotating with the said crank-plate, a contact-lever for the other switch the said lever being operated by the movements of the hopper-door, a supplementary electromagnet retaining the contact-lever out of engagement, an electric circuit for the said supplementary magnet, and a switch in the said circuit controlled by the dribble-gate, substantially as described.

In witness whereof we have hereunto set our hands in presence of two witnesses.

CHARLES JOHN SIMEON.
THOMAS ST. JULIAN BABINGTON PARNALL.
WILLIAM EDWARD HIPKINS.

Witnesses:
  EDWARD MARKS,
  JOHN MORGAN.